(No Model.)
H. GOHRT.
MEASURING INSTRUMENT.
No. 492,886. Patented Mar. 7, 1893.
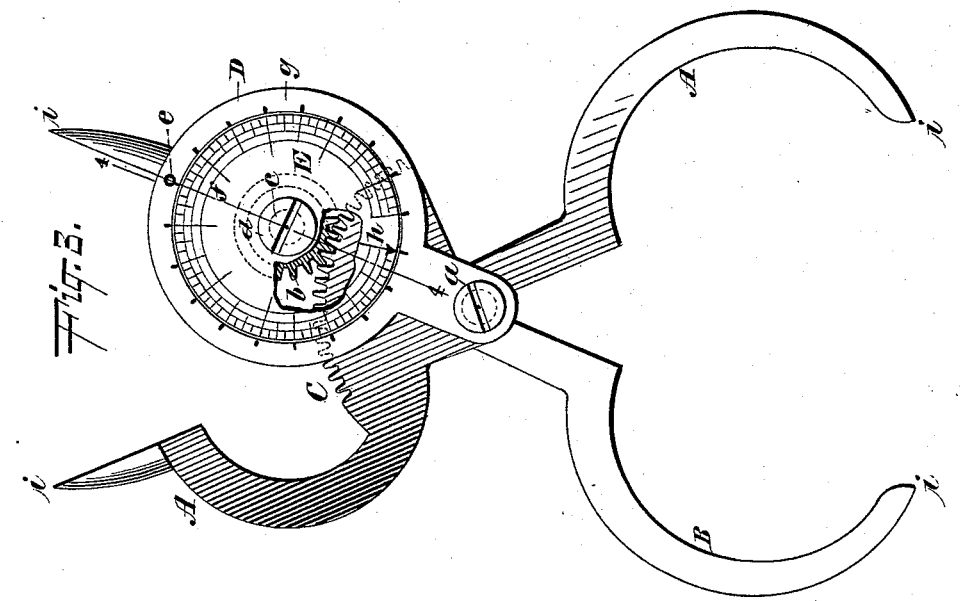
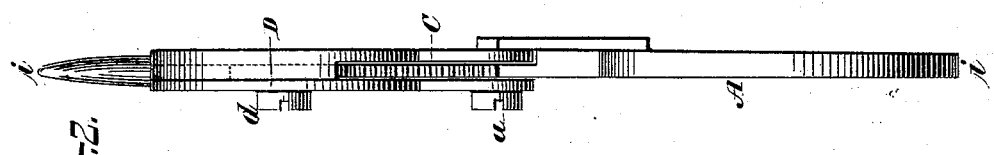
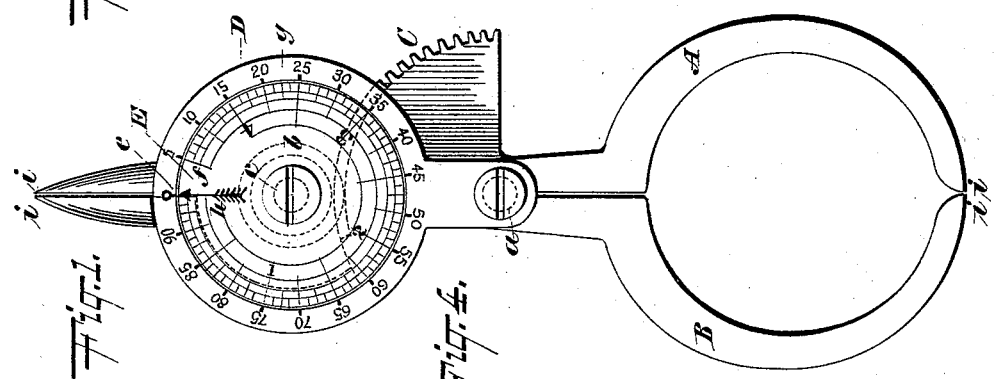
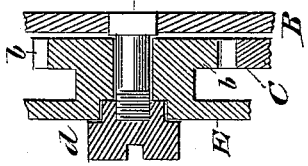
WITNESSES:
Gustave Dieterich.
L. M. Wachschlager.
INVENTOR:
Hermann Gohrt,
BY Briesen & Knauth
his ATTORNEYS.
THE NORRIS PETERS CO., PHOTO-LITHO., WASHINGTON, D. C.

UNITED STATES PATENT OFFICE.

HERMANN GOHRT, OF LIVERPOOL, ENGLAND, ASSIGNOR OF ONE-HALF TO ISAAC BECK, OF SAME PLACE.

MEASURING-INSTRUMENT.

SPECIFICATION forming part of Letters Patent No. 492,886, dated March 7, 1893.

Application filed October 24, 1892. Serial No. 449,752. (No model.)

*To all whom it may concern:*

Be it known that I, HERMANN GOHRT, a citizen of Germany, residing at Liverpool, England, have invented a new and useful Improvement in Measuring-Instruments, of which the following is a full, clear, and exact description, reference being had to the accompanying drawings, wherein like letters refer to like parts in the various views, and in which—

Figure 1 is a front view of my improved measuring instrument, showing it closed. Fig. 2 is a side or edge view of the same. Fig. 3 is a front view of my instrument showing it opened, with parts broken away. Fig. 4 is an enlarged detailed section on the line 4—4, Fig. 3.

My invention relates to a new and useful improvement in measuring instruments, and consists in the novel arrangement and combination of parts hereinafter described and specifically pointed out in the claims.

The object of my invention is to provide measuring instruments, such as calipers, dividers, compasses and the like, with means whereby the distance of the opening of such instrument, together with the degree of the angle formed thereby, will be registered and measured.

In the drawings I have shown a combined compass and outside caliper, constructed in accordance with my invention, although it is obvious that my invention might be applied to any suitable measuring instrument without departing from the spirit of my invention.

I will now proceed to describe my invention as shown in the accompanying drawings.

A, B represent two sections of a measuring instrument, pivoted together by the pin $a$. One of these sections, A, is provided with a sector-shaped rack C, whose center coincides with the center or axis of the pivot $a$. The other section, B, has a stationary annular dial D mounted thereon, within which is fitted a movable circular dial E. This dial E is provided with a pinion $b$ rigidly secured thereto and adapted to engage with the teeth of the rack C. The movable dial E, with the pinion $b$ attached thereto, is pivoted by a pin $c$ to the section B, and is held in place thereon by nut $d$ or its equivalent. (See Fig. 4.)

On each of the dials D E is a scale, one of said scales $f$ indicating a lineal measurement, such as inches, so that a pointer $e$ on the other dial will point to and thus indicate the lineal measurement on the scale $f$ of dial E. The other dial D is provided with a scale $g$ of degrees of a circle, the number of degrees being indicated by a pointer $h$ on the other dial E. When the instrument is closed, as in Fig. 1, the pointers $e$ and $h$, the center of pivot $c$ and the center of pivot $a$ are in exact alignment. Both pointers in this position indicate zero. As the instrument is opened— see Fig. 3,—the disk-dial E is turned to correspond to the extent of opening, the pointer $e$ showing opposite scale $f$ how many inches (or other unit of measure) the prongs $i\,i$ have been spread apart. At the same time the pointer $h$ of the rotating dial E has traveled along the annular scale $g$ and indicates thereon the size of the angle described by the lines drawn from the prongs $i\,i$ to the axis of the pivot $a$. Either of the scales may be the lineal and either the angle measure.

Having described my invention, what I claim, and desire to secure by Letters Patent, is—

1. The combination of two pivoted sections A, B, indicating devices D, E and means substantially as described for operating said indicating devices whereby an indication of the distance between the arms is had of said instrument and the angle formed by said arms, substantially as set forth.

2. The combination of two pivoted sections A, B, stationary dial D, movable dial E carried by one of said sections and means substantially as described for moving said dial E, when the sections are opened or closed, whereby the distance between the arms of the instrument and the angle formed by said arms are indicated, substantially as set forth.

3. The combination of two sections A, B, sector-rack C mounted on one of said sections, pinion $b$ engaged by said rack C and rotary indicator E carried on the other section and operated by the rack, substantially as described.

4. In a measuring instrument, composed of sections A, B, that are pivoted together, the combination of said sections with the rack C carried by one of said sections and with the pinion $b$, rotary dial E and annular fixed dial D carried by the other section, the dial E having a circumferential scale $f$ and pointer $h$, and the dial D having scale $g$ and pointer $e$, all arranged to measure the angle between and the distance apart of the sections A B when opened, as specified.

HERMANN GOHRT.

Witnesses:
 WM. CROPPER,
  *Notary Public, Liverpool.*
 THOMAS ASHTON,
  *His Clerk.*